May 7, 1940. G. S. ALLIN Re. 21,447
BULLDOZER
Original Filed Nov. 25, 1933 3 Sheets-Sheet 1
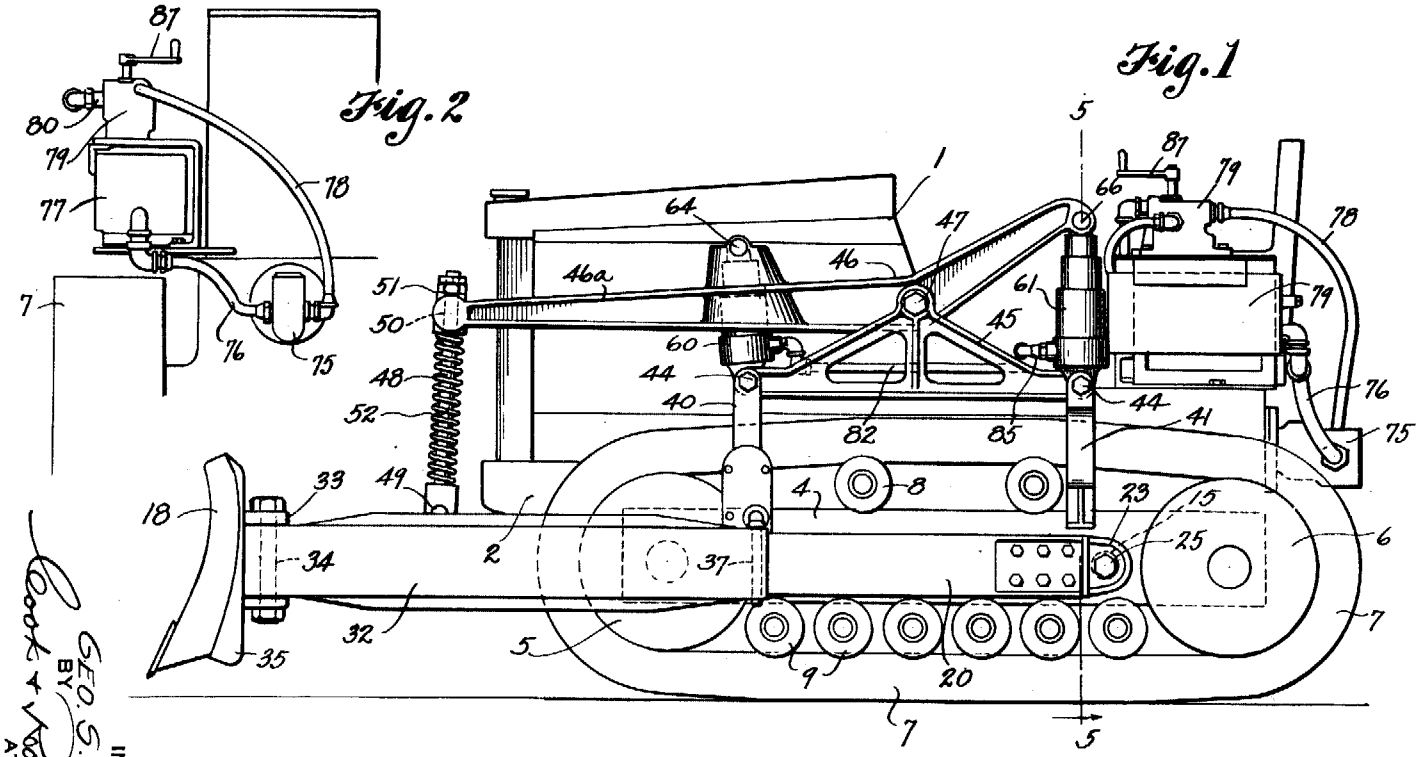
INVENTOR
GEO. S. ALLIN
BY
Cook & Robinson
ATTORNEY

BULLDOZER

Original Filed Nov. 25, 1933 3 Sheets-Sheet 2

INVENTOR
GEO. S. ALLIN
BY
Cook & Robinson
ATTORNEY

May 7, 1940. G. S. ALLIN Re. 21,447
BULLDOZER
Original Filed Nov. 25, 1933 3 Sheets-Sheet 3
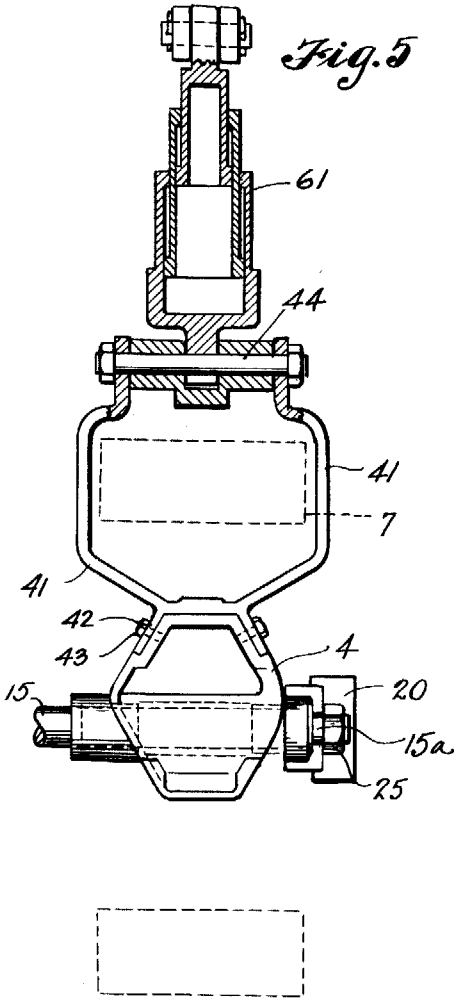
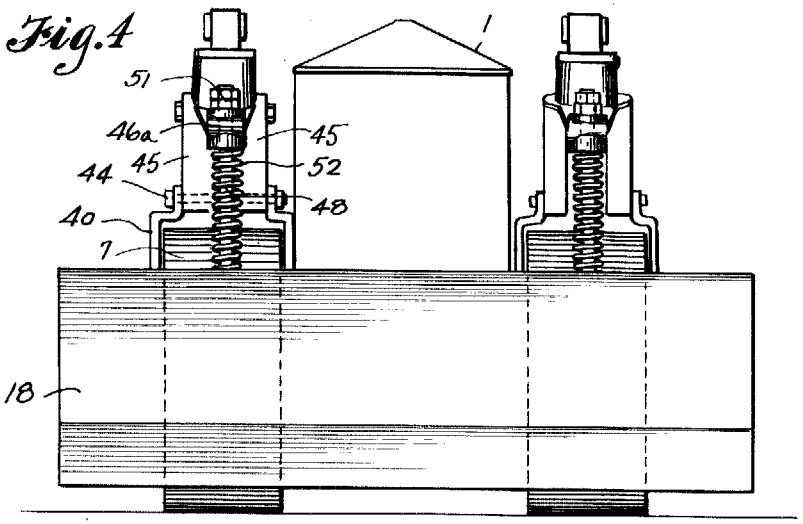
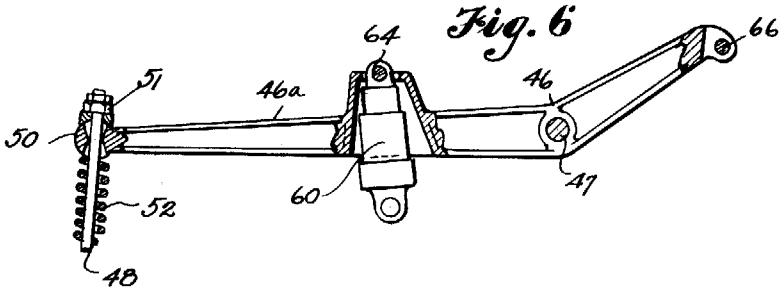
INVENTOR
GEO. S. ALLIN
BY
Cook & Robinson
ATTORNEY Reissued May 7, 1940 Re. 21,447

UNITED STATES PATENT OFFICE 21,447

BULLDOZER

George S. Allin, Seattle, Wash., assignor, by mesne assignments, to Gar Wood Industries, Inc., Detroit, Mich., a corporation of Michigan Original No. 2,125,481, dated August 2, 1938, Serial No. 699,759, November 25, 1933. Application for reissue October 2, 1939, Serial No. 297,599

12 Claims. (Cl. 37—144)

This invention relates to improvements in earth moving machines and it has reference more particularly to motorized machines of that character now generally known in trade as "Bulldozers" and "Roadbuilders", and which are extensively used in road building, grading, excavating and other earth moving operation. Such machines, in their general arrangement, employ a tractor for the motive power and this is usually of the crawler type. Forwardly of the tractor a blade is mounted for the grading or moving of dirt and this is suspended from the tractor frame for adjustment to different depths and for casting the dirt to either side of the roadway.

Heretofore it has been customary to support the blade at its different positions of adjustment by means of lifting devices mounted partly on the main frame of the tractor and to actuate it by various arrangements of links and levers to which power was manually applied, or applied by geared connections with the tractor drive shaft. However, the suspending of the lifting devices from the main frame of the tractor has the disadvantage of placing considerable strain on the front spring support connecting the main frame with the track frames and furthermore, adjustment of the blade while the vehicle was in motion has been difficult.

It is the principal object of the present invention to improve upon the construction of machines of this character as heretofore used, particularly in the means for and manner of suspending the blade so that it may be more easily and more positively adjusted to various positions and whereby the strain or forces applied through the blade and its supports is received by the track frames and not by the main tractor frame as is usually the case.

Another object of the invention is to utilize rocker arms at opposite sides of the tractor for raising and lowering the blade and to actuate the rocker arms by hydraulic cylinder mechanisms which will operate quickly and positively and can be locked at any set position of adjustment. Also, which may be operated to change the setting of the blade while the tractor is in operation.

Another object of the invention resides in the details of construction of the mechanical devices for rigidly and securely supporting the blade and its adjusting means from the track frames of the tractor in a manner whereby forces applied through the blade and its supports will be absorbed directly by the tracks and not applied to the tractor frame.

Other objects of the invention reside in the details of construction of the various parts, in their relationship and mode of operation, as will hereinafter be more fully described.

In accomplishing these and other objects of the invention I have provided the improved details of construction, the preferred forms of which are illustrated in the accompanying drawings, wherein:

Fig. 1 is a side elevation of a machine embodying the present invention.

Fig. 2 is a partial rear elevation showing the pump, valve and storage tank used in connection with the hydraulic cylinders.

Fig. 4 is a front elevation of the same.

Fig. 5 is a transverse section, substantially on line 5—5 in Fig. 1.

Fig. 6 is a side view, partly broken away for better illustration, of a rocker arm used in the blade adjusting means.

Figure 3:
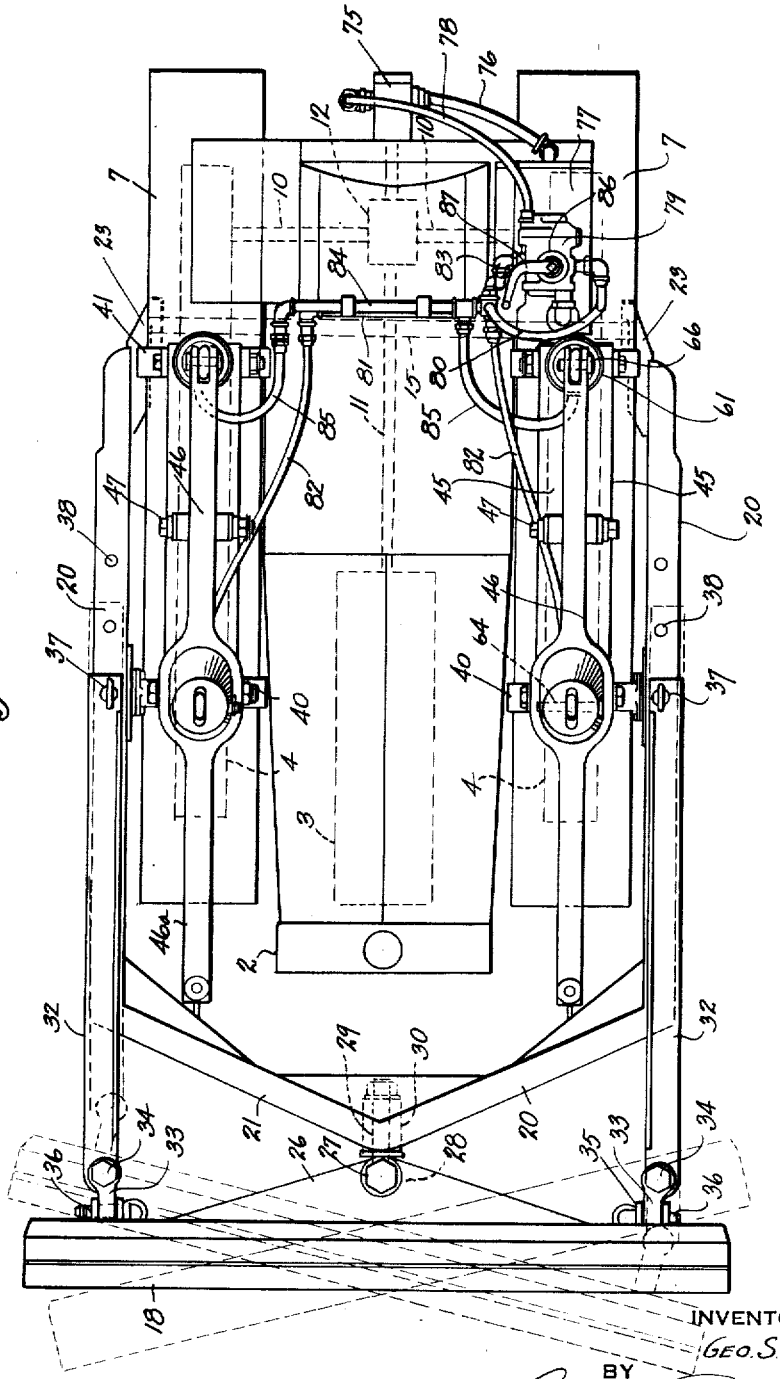
Fig. 3 is a plan view of the machine.

Referring more in detail to the drawings:

In its present embodiment the machine utilizes a tractor of the crawler, or self laying track type, as seen best in Fig. 1. The tractor is designated in its entirety by reference numeral 1 and it includes the usual main frame structure, or chassis 2 which mounts the engine designated at 3. At opposite sides of the main frame are the track mounting frames 4—4. At the forward ends of the frames 4—4 are track mounting wheels 5 and at their rearward ends are the track driving wheels 6. The traction belts or tracks 7—7 are extended about the wheels 5 and 6 and between these wheels the upper runs of the tracks are supported by idler rollers 8 and the lower run is guided and held in contact with the ground by idling rollers 9; the rollers 8 and 9 being supported from the track frames 4—4 as is the usual practice.

In this construction, the belt driving wheels 6—6 are driven by means of the differential shafts 10—10, which as seen in Fig. 3, are driven from the engine shaft 11 through suitable transmission gearing 12.

The two track frames 4—4 are arranged symmetrically at opposite sides of the main frame of the tractor and near their rearward ends are rotatably mounted upon the opposite ends of a shaft 15 which is fixed in and extends transversely through the main frame of the tractor as a support for the latter. The forward end of the tractor would be supported from the track frames through the mediacy of springs, not shown, to permit of a relative upward or downward movement of the tracks incident to travel over uneven surfaces.

The earth moving blade 18 is mounted forwardly of the tractor by means of a yoke like supporting frame comprising opposite side beams 20—20 extending along opposite sides of the tractor and rigidly connected across their forward ends by a cross bar 21 of a forwardly pointed V-like form. At their rearward ends the side beams 20—20 have brackets 23 fixed thereto and these are formed with bearings which are rotatably fitted to the opposite end portions 15a of the cross shaft 15. Nuts 25 are threaded onto the ends of the shaft to hold the parts properly assembled. This manner of mounting the blade supporting frame permits the forward end to be raised or lowered thereby to adjust the elevation of the blade 18.

The ground working blade 18 is preferably straight from end to end and is of such length that its ends terminate outside the longitudinal lines of the outside of the tracks. At the back side of the blade, midway between its ends, are vertically spaced flanges 26—26 which mount a vertical pin 27 extending pivotally through a swivel head 28. This head is provided with a horizontal shank 29 rotatably mounted in a bearing 30 fixed centrally in the cross beam 21 of the blade supporting frame. The connection provides for adjusting the blade to different angular positions across the line of travel of the tractor, as well as vertical adjustment of the ends of the blade.

Slidably overlying the opposite side beams 20—20 of the blade mounting frame are brace struts 32—32 for the blade. These struts are connected at their forward ends to the opposite ends of the blade through the mediacy of knuckles 33. These are pivotally attached to the beam ends by vertical pivot pins 34 and are likewise attached to flanges 35 on the back side of the blade by horizontal pivot pins 36. At their rearward ends the brace beams 32—32 are rigidly secured to the side beams 20—20 of the blade mounting frame by means of vertical pivot pins 37 extended through registering holes in the parts. Angular adjustment of the blade is permitted by withdrawing the pins 37 and there are holes 38 provided in spaced relation along the coacting beams to receive the pins for the different positions of adjustment of the blade.

The side beams of the blade supporting frame preferably are of channel iron, facing inwardly, and the struts 32 likewise are of channel iron and telescopically fitted over the frame beams. Thus, the flanges of the struts 32 engage the frame beams to prevent upward or downward tilting of the forward ends of the struts relative to the frame. This construction is thus rendered rigid and substantial, yet easily and readily adjustable.

The novelty of the present invention resides particularly in the means for quickly adjusting the blade to different elevations and for holding it at the different positions of adjustment. In accordance with the invention, as seen in Fig. 1, a pair of yokes is fixed to each track frame 4—4; there being one yoke 40 fixed to each track frame near its forward end and a yoke 41 fixed to the frame near its rearward end. These yokes, as seen in Fig. 5, open upwardly and rest upon the track frames and have diverging base flanges 42 secured by bolts 43 to the frames to hold them rigidly in upright position. Both yokes at each side are open for passage of the upper run of the track belt therethrough and each pair of yokes supports the opposite ends of a pair of parallel, truss-like bars 45 above the track and longitudinally thereof; there being pins 44 extended through the upper ends of the yoke arms and through the ends of the truss bars to support the latter.

Disposed between the truss bars 45 at opposite sides of the tractor are rocker levers 46—46 pivotally supported by pivot bolts 47 extended therethrough and through the apex portions of paired trusses.

Each lever 46 extends lengthwise of the track in vertically spaced relation in alignment with the center line thereof and has a relatively long forward arm 46a, the forward end of which is positioned ahead of the tracks and track frames, as shown most clearly in Fig. 3. Substantially vertically disposed bolts 48 connect the forward ends of these lever arms 46a with the forward portion of the blade mounting frame. The bolts 48 are attached at their lower ends by pivot pin 49 to flanges on the frame bar 21 and at their upper ends extend loosely through vertical openings 50 at the forward ends of the levers and have nuts 51 threaded onto their upper ends to complete the connection. Coiled springs 52 are placed loosely about the bolts 48 to bear at their opposite ends against the frame members and lever arms to yieldingly resist upward movement of the frame and to act as shock absorbing means for the frame.

Movement of the rocker arms 46 for raising or lowering the blade frame is under control of hydraulic means as will now be described. Associated with each lever are paired hydraulic cylinders 60—61; each of which comprises a series of telescopic cylindrical sections, as seen best in Fig. 5. The lower sections of the paired cylinders are pivotally mounted by the cross bolts 44 which support the opposite ends of the truss bars. The upper end section of the cylinder 60 at each side is pivotally attached by a pin 64 to the lever arm at a point forwardly of its supporting pin 47. Likewise the upper section of cylinder 61 at each side is pivotally attached by a pivot pin 66 to the rearward end of the lever which, as seen in Fig. 1, is relatively short and is upwardly directed. The arrangement provides that if the rearward cylinders are extended by an application of pressure medium thereto, the forward ends of the lever arms will be actuated downwardly and the blade supporting frame will be lowered accordingly. Also, if the forward cylinders are extended, the arms will be lifted and the blade raised accordingly.

Actuation of the hydraulic cylinders for raising or lowering the blade is effected by application of a liquid pressure medium to one set of cylinders while relieving pressure from within the other cylinders. As seen in Figs. 2 and 3, there is a hydraulic pump 75 operatively connected to be driven by the engine shaft, and this pump has its inlet side connected by a hose 76 with a tank 77 containing a supply of liquid such as oil. The discharge side of the pump is connected by a hose 78 with a valve housing 79. The housing 79 has a hose connection 80 with a header 81 from which hoses 82—82 lead respectively, to the forward cylinders 60, and also it has a hose connection 83 leading to a header 84 from which hose connections 85—85 lead to the rearward cylinders 61. A valve plug 86 is movable in the valve housing by means of a lever 87 to provide for forcible application by the pump of pressure medium to either the forward or rearward cylinders while draining the others into the tank. A neutral position of the valve closes all the cylinders to inlet or outlet of liquid and this retains the levers at set positions.

A feature of this construction is in the provision for equalization of pressure in the corresponding cylinders at opposite sides of the vehicle. This is possible by reason of the corresponding cylinders being inter-connected through the distributing headers. Thus, pressure in each cylinder is equalized with that in the other.

The present arrangement of mechanism for actuating the blade to different levels is especially desirable for the reason that all strain applied through the blade is received by the tracks and is not applied to the main frame. This affords more rigidity and durability and adds materially to the life of the equipment.

Having thus described my invention, what I claim as new therein and desire to secure by Letters Patent is:

1. In combination, a tractor having a main frame, track frames at opposite sides thereof, a cross shaft fixed in the main frame and pivotally mounting the track frames, a blade mounting frame pivotally mounted on the ends of the cross shaft and extending about the forward end of the tractor, a blade mounted by the latter frame across the front of the tractor, lever arms pivotally mounted on the track frames with ends operatively connected with the blade frame, and means secured on the track frames for adjusting the positions of the levers to raise or lower the blade frame and for holding said levers at set positions of adjustment.

2. In combination, a tractor having a main frame, relatively movable track frames at opposite sides thereof, means for mounting a blade forwardly of the tractor for vertical adjustment, lever arms pivotally mounted on the track frames, with movable ends operatively connected with the blade mounting means for adjusting and retaining the latter at different positions of vertical adjustment and hydraulic means on the track frames for adjusting the lever arms and for holding them rigid relative to the track frames.

3. In combination, a tractor having a main frame and relatively movable track frames at opposite sides, a frame mounting a blade forwardly of the tractor for vertical adjustment, pivotally supported rocker levers on the track frames, means connecting the levers with the blade mounting frame for adjusting it vertically, hydraulic cylinders on the track frames operatively connected to the rocker levers and means for selectively applying a pressure medium to said cylinders to actuate the levers together in opposite directions.

4. In combination, a tractor comprising a main frame, track frames at opposite sides thereof, a blade mounting frame on the tractor and extending forwardly thereof, a blade mounted by the latter frame, a rocker lever pivotally mounted on each track frame, means connecting the forward ends of said levers with the blade frame, a pair of hydraulic cylinders mounted on each track frame and connected with the corresponding rocker lever at opposite sides of its pivot point and means operable for selectively applying a pressure medium to the cylinders to actuate the lever arms for vertically adjusting the blade mounting frame and for closing said cylinders to retain the pressure medium to hold the blade frame at different positions of adjustment.

5. In combination, a tractor having a main frame, a cross shaft mounted in the main frame, track frames pivotally mounted on the ends of the cross shaft at opposite sides of the main frame, a blade mounting frame extended across the forward end and along the sides of the tractor and pivotally mounted on the ends of the cross shaft, a blade mounted by the said frame across the forward end of the tractor, a rocker lever pivotally supported upon each track frame, a link operatively connecting the forward end of each lever with the forward end of the blade frame, a pair of hydraulic cylinders mounted on each track frame and operatively connected with the corresponding lever arm at opposite sides of the pivot, a hydraulic pump, pipes connecting each cylinder with its corresponding cylinder at the opposite side of the tractor, and a valve mechanism connected with the pump and adjustable to positions for a selective application of hydraulic pressure medium to either set of cylinders while relieving pressure from the other set and adjustable to a neutral position to retain any adjustment of the levers.

6. In a road working machine, a main frame, track frames pivotally connected thereto, a scraper frame pivotally connected to said track frames, a pair of supports extending upwardly from each of said track frames, a bell crank arm pivotally mounted on each pair of supports, means interconnecting one end of each of said bell crank arms and said scraper frame, and actuating mechanism mounted on one support of each pair, said actuating mechanisms each being connected to one end of its respective bell crank arm and effective to tilt said arm to raise and lower said scraper frame.

7. In a road working machine, a main frame, a track frame connected thereto, a scraper frame pivotally mounted on said track frame, a pair of supports extending upwardly from said track frame, a member rigidly interconnected to said supports, a lever pivotally connected to said member and having one end connected to said scraper frame and hydraulic means interconnecting said lever with each of said supports for tilting said lever whereby to vary the vertical position of said scraper frame.

8. In a machine of the character described including a tractor, push beams pivotally connected to the tractor and a road implement carried by the push beams, the improvement which comprises fluid pressure rams operatively connecting the push beams and the tractor, means for supplying fluid under pressure to the ram cylinders for positively moving the implement up and down relative to the tractor, said ram cylinders being communicatively interconnected to uniformly distribute fluid pressure therein and thereby effect equalization of pressures during both up and down positive movement of the implement irrespective of movement of the tractor in going over uneven ground and a single valve for controlling the supply of fluid to all of said ram cylinders.

9. In a machine of the character described including a tractor, push beams pivotally connected to the tractor and an implement carried by the push beams, the improvement which comprises hydraulic rams on each side of the tractor operatively connecting the push beams and the tractor, means for supplying a hydraulic fluid under pressure to the ram cylinders for positively moving the implement up and down relative to the tractor, means establishing fluid interconnection between said ram cylinders to uniformly distribute said fluid to the ram cylinders to thereby effect equalization of pressures in the ram cylinders at opposite sides of the tractor during both up and down positive movement of the implement and a single valve for controlling the supply of fluid to all of said ram cylinders.

10. A scraper comprising a frame structure, including spaced side frame beams, means supporting said frame beams above the ground, a scraper assembly in pivotal relation to said frame beams, a fluid pressure operated means operatively connecting one side of the scraper assembly with the frame beam on said side, a second fluid pressure operated means operatively connecting the other side of said scraper assembly with the other frame beam, and fluid pressure supply lines communicating with both fluid pressure operated means for supplying fluid under pressure thereto to force the scraper assembly downwardly against the ground by positive hydraulic pressure and to raise the scraper assembly upwardly by positive hydraulic pressure, whereby the said fluid pressure operated means at opposite sides are in fluid intercommunication and fluid will flow freely between the fluid pressure operated means to equalize the applied pressures on both sides of the scraper during both upward and downward positive pressure movements of the scraper assembly even when the frame beams are at different levels in going over uneven ground and a single valve for controlling the supply of fluid to both of said fluid pressure operated means simultaneously.

11. In a machine of the character described including a tractor of the track type with independently movable track frames, push beams pivotally connected to the track frames and a road implement carried by the push beams, the improvement which comprises fluid pressure rams operatively connecting the push beams and the tractor, means for supplying fluid under pressure to the ram cylinders for positively moving the implement up and down relative to the tractor, said ram cylinders being communicatively interconnected to uniformly distribute fluid pressure therein and thereby effect equalization of pressures during both up and down positive movement of the implement, irrespective of movement of the tractor in going over uneven ground and a single valve for controlling the supply of fluid to all of said ram cylinders.

12. In a machine of the character described including a tractor of the track type with independently movable track frames, push beams pivotally connected to the track frames and an implement carried by the push beams, the improvement which comprises hydraulic rams on each side of the tractor operatively connecting the push beams and the tractor, means for supplying a hydraulic fluid under pressure to the ram cylinders for positively moving the implement up and down relative to the tractor, means establishing fluid interconnection between said ram cylinders to uniformly distribute said fluid to the ram cylinders to thereby effect equalization of pressures in the ram cylinders at opposite sides of the tractor during both up and down positive movement of the implement and a single valve for controlling the supply of fluid to all of said ram cylinders.

GEORGE S. ALLIN.

DISCLAIMER

Re. 21,447.—*George S. Allin*, Seattle, Wash. BULLDOZER. Patent dated May 7, 1940. Disclaimer filed Jan. 24, 1946, by the assignee, *Gar Wood Industries, Inc.*

Hereby enters this disclaimer to claims 2, 3, 8, 9, 10, 11, and 12.

[*Official Gazette March 5, 1946.*]